United States Patent [19]

Ross

[11] Patent Number: 6,056,315
[45] Date of Patent: May 2, 2000

[54] AIRBAG

[75] Inventor: Hubert Rene Ross, Oberursel, Germany

[73] Assignee: Breed Automotive Technology, Inc., Lakeland, Fla.

[21] Appl. No.: 09/155,454

[22] PCT Filed: Apr. 2, 1997

[86] PCT No.: PCT/GB97/00916

§ 371 Date: May 13, 1999

§ 102(e) Date: May 13, 1999

[87] PCT Pub. No.: WO97/37875

PCT Pub. Date: Oct. 16, 1997

[30] Foreign Application Priority Data

Apr. 4, 1996 [GB] United Kingdom ................ 96 07 204

[51] Int. Cl.⁷ ..................................................... B60R 21/16
[52] U.S. Cl. ..................................... 280/728.2; 280/728.3
[58] Field of Search ............................. 280/728.3, 728.2, 280/731, 732

[56] References Cited

U.S. PATENT DOCUMENTS 5,456,448 10/1995 Bauer ..................................... 280/728.1
5,704,635 1/1998 Tajiri et al. .......................... 280/728.3

FOREIGN PATENT DOCUMENTS

WO 94/10010 5/1994 WIPO ................................ 280/728.3

*Primary Examiner*—Eric Culbreth
*Attorney, Agent, or Firm*—Markell Seitzman

[57] ABSTRACT

An arrangement for attaching a vehicule safety restraint airbag cover (5) to a housing (3), particularly for use with a driver's side airbag (1). The arrangement comprises: an airbag housing (3) having an internal space for receiving an airbag (1), and a side wall having at least one raised catch member (8); an airbag cover (5) having a hinge member (6) in which is formed at least one aperture (7) through which the catch member (8) extends, and an inflator mounting bracket (10) having a base wall which is arranged adjacent and parallel to the base of the housing (3), and a side wall which is arranged to extend substantially parallel to the side wall of the housing and to sandwich the hinge member (6) of the cover (5) between the bracket (10) and the housing side wall. A metal insert (12) may be moulded into the hinge member (6) of the cover (5) to strengthen it. The side wall of the bracket (10) may be formed with teeth (14) which fit inside the upstanding catch member (8) on the side wall of the housing (3), so as to lock the hinge (6) even more securely to the housing (3) against forces applied to the cover (5). Thus the arrangement provides a relatively low cost, easily and safely assembled airbag module using a minimum number of parts.

7 Claims, 4 Drawing Sheets

AIRBAG

DESCRIPTION

The present invention relates to an arrangement for attaching a vehicle safety restraint airbag cover to a housing. It is particularly but not exclusively for use with a driver's side airbag or face bag.

An airbag comprises an inflatable cushion of fabric connected to inflation means such as a gas generator and is folded into a compact form and mounted in the vehicle in a rigid-housing. The housing is usually made of pressed metal. The folded airbag is protected by a cover from damage and from the ingress of dust and dirt. The cover is usually made of a flexible plastics material, particularly on the driver's side where the airbag is mounted in the steering wheel. The cover must be formed and attached in such a way that it acts like a flap when the airbag is deployed in a crash. On the other hand it must be securely mounted in the housing so as not to break loose on deployment and become a dangerous projectile in the interior of the vehicle.

One way of preventing the airbag cover from breaking loose altogether in the event of a crash is to make a tear line, i.e., a line of weakness, in the cover to encourage it to split in a controlled manner. However such a tear line is unsightly and is not generally acceptable to a vehicle manufacturer if it is visible to a vehicle occupant.

It is also known to attach the cover to the housing by frangible rivets but this requires a relatively complex assembly process and the small parts may break loose on deployment of the airbag, becoming dangerous projectiles.

The present invention aims to provide a relatively easy, low cost and safe assembly for an airbag cover using a minimum of parts.

According to the present invention there is provided an airbag arrangement comprising:

an airbag housing having an internal space for receiving an inflatable airbag cushion, bounded by a base wall and a plurality of side walls at least one side wall having at least one catch member extending therefrom outwardly of the space, an airbag cover having a hinge member in which is formed at least one aperture dimensioned and positioned to receive a respective catch member, and an inflator mounting bracket having a base wall which is arranged adjacent and parallel to the base of the housing, and a side wall which is arranged to extend substantially parallel to the side wall of the housing and to sandwich the hinge member of the cover between the bracket and the housing side wall.

A metal insert may be moulded into the hinge member of the cover to strengthen it and may optionally fit under the raised catch member to assist retention of the cover on the housing.

Preferably, or in addition, the side wall of the bracket is formed with at least one tooth, formed for example by a slot, at its upper edge, which tooth is dimensioned to fit inside the upstanding catch member on the side wall of the housing, so as to lock the hinge member securely to the housing against forces applied to the cover.

Preferably the housing is formed with a plurality of raised catch members which cooperate with respective ones of a plurality of apertures in the hinge member and respective ones of a plurality of teeth in the inflator bracket.

According to a preferred embodiment the upstanding or raised catch member or members are formed as pressed, externally jutting flap members, and take the form of noses.

An airbag arrangement according to the invention provides an improved system for holding an airbag cover securely to an airbag module without the need for rivets or other components. The arrangement is relatively simple to assemble and after assembly provides a strong attachment against very high forces.

The arrangement can be applied to all side walls (there are usually four) of the airbag module, for extra strength.

For a better understanding of the present invention and to show how the same may be carried into effect, reference will now be made to the accompanying drawings in which.

Figure 1:
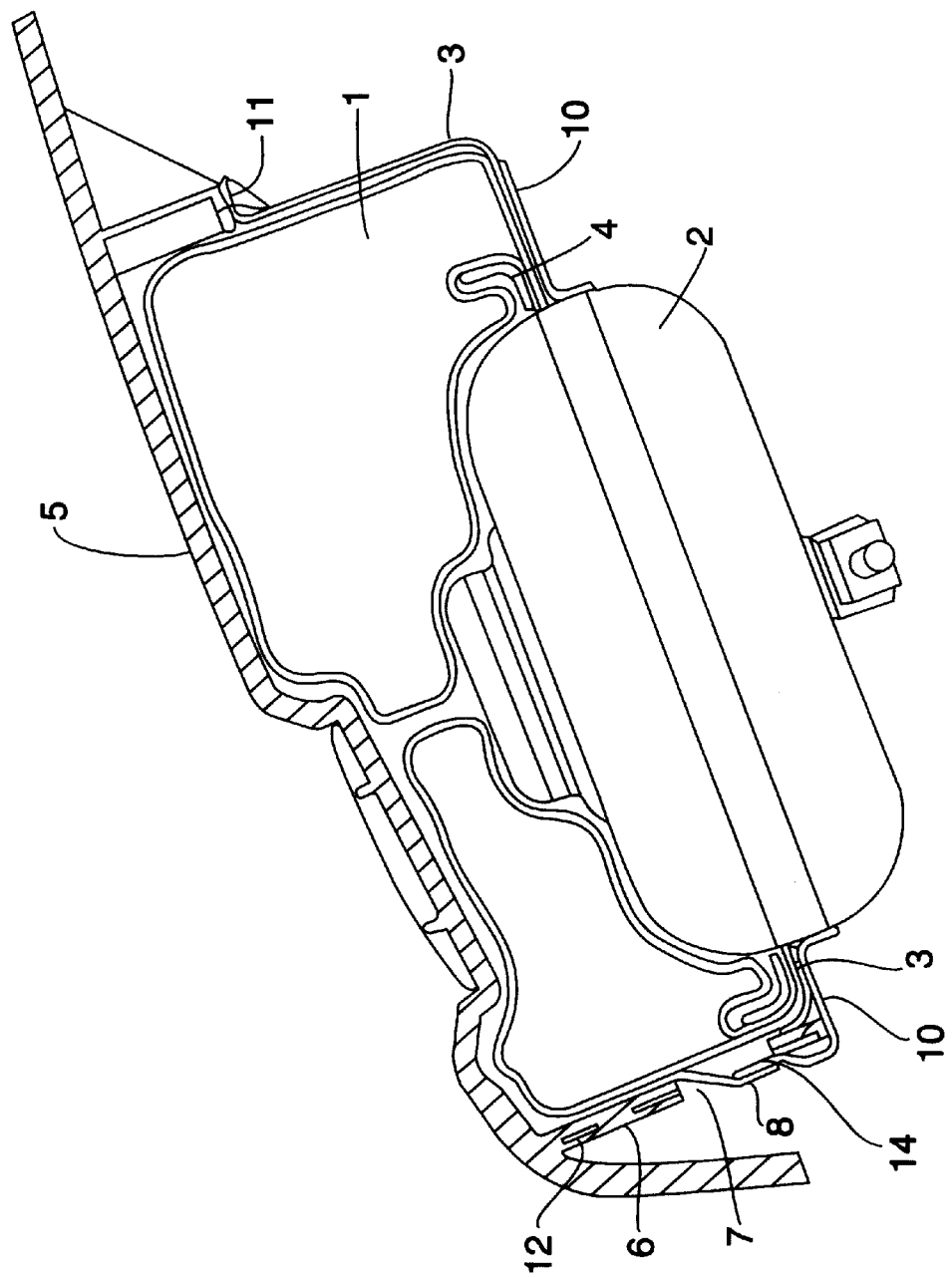
FIG. 1 is a cross-sectional view of an arrangement according to the present invention.

In FIG. 1 an airbag 1 is shown folded and mounted over inflator 2 in airbag housing 3 by retainer ring 4. Airbag cover 5 protects the airbag and fits over the otherwise open top of the housing 3. A hinge part 6 has a hole 7 which fits over and is retained by an outwardly jutting flap or catch 8 in a side wall of the housing. This flap 8 is integral with the side wall of the housing and is, for example, formed by making a slit in the wall at 9 and pressing or punching outwardly the area directly above the slit to form a nose-like protrusion with side walls and a top wall but having an opening at the bottom.

Figure 4:
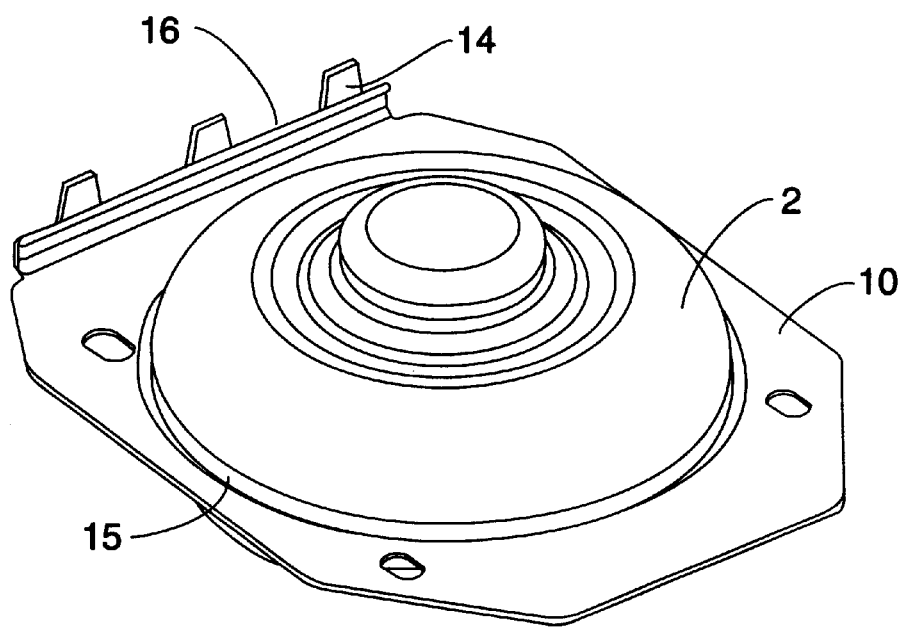
FIG. 4 is a perspective view of an inflator and bracket for use in the arrangement of FIG. 1.

The inflator is mounted to or is integral with a mounting bracket 10 which is an L-shaped piece of pressed metal and is shown more clearly in FIG. 4. It is juxtaposed to the housing with its base wall extending parallel to the base of the housing and its side wall parallel to a side wall of the housing so as to sandwich the hinge part 6 of the cover 5 against the side wall of the housing. To hold the hinge of the cover more securely the upper edge of the side wall of the bracket is segmented to form at least one tooth 14 and this fits behind the flap 8. The inflator and inflator bracket are fitted into the airbag module as a last stage of the assembly process. The upper edge of the bracket side wall may alternatively abut the outer side of the flap 8 and will still sandwich the cover hinge part 6 to the housing 3, and retain it in position. Thus the outward forces present on the side walls of the housing on deployment of the airbag in a crash are substantially prevented from bending the bracket side wall outwardly. The cover hinge part 6 may be strengthened by an optional metal insert 12 moulded into the cover hinge part, as shown in FIG. 1.

In this example the airbag cover 5 fits over a housing flange 11 at the other side walls (one of which is shown). On deployment these attachments unlatch relatively easily to allow the cover to rotate about the hinge part 6. Other means may be used of mounting the cover to the housing on the other side walls such that the mounting detaches during deployment. The interconnecting flap and aperture arrangement may alternatively be used on all sides.

Figure 2:
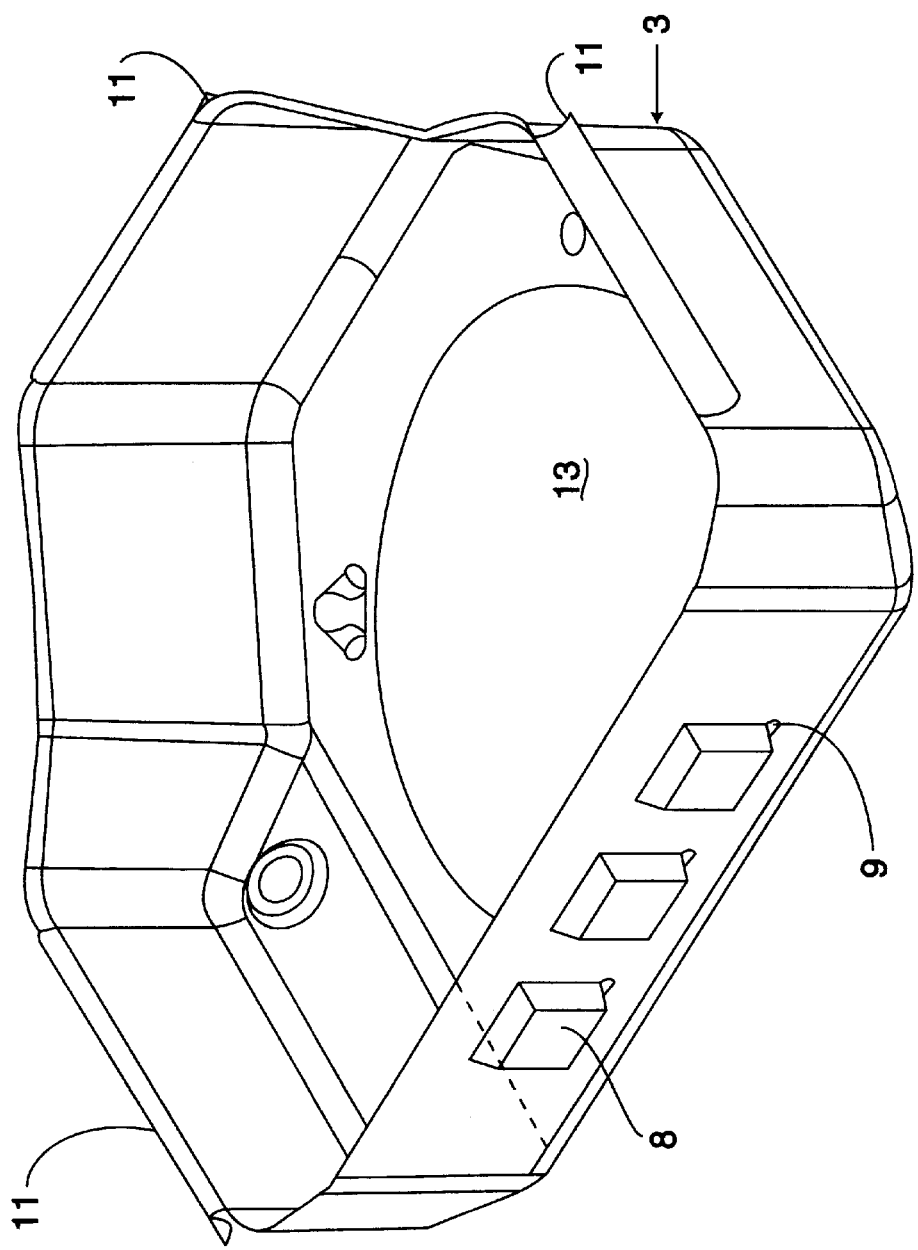
FIG. 2 is a perspective drawing of an airbag housing for use in the arrangement of FIG. 1.

FIG. 2 is a perspective view of the airbag module housing 3. This is made of steel and has a hole 13 in its base wall to receive the inflator 2. Three side walls have flanges 11 (but could have other means) for retaining the airbag cover and one side wall has outwardly protruding flaps 8 formed therein, for retaining the cover hinge part 6.

Figure 3:
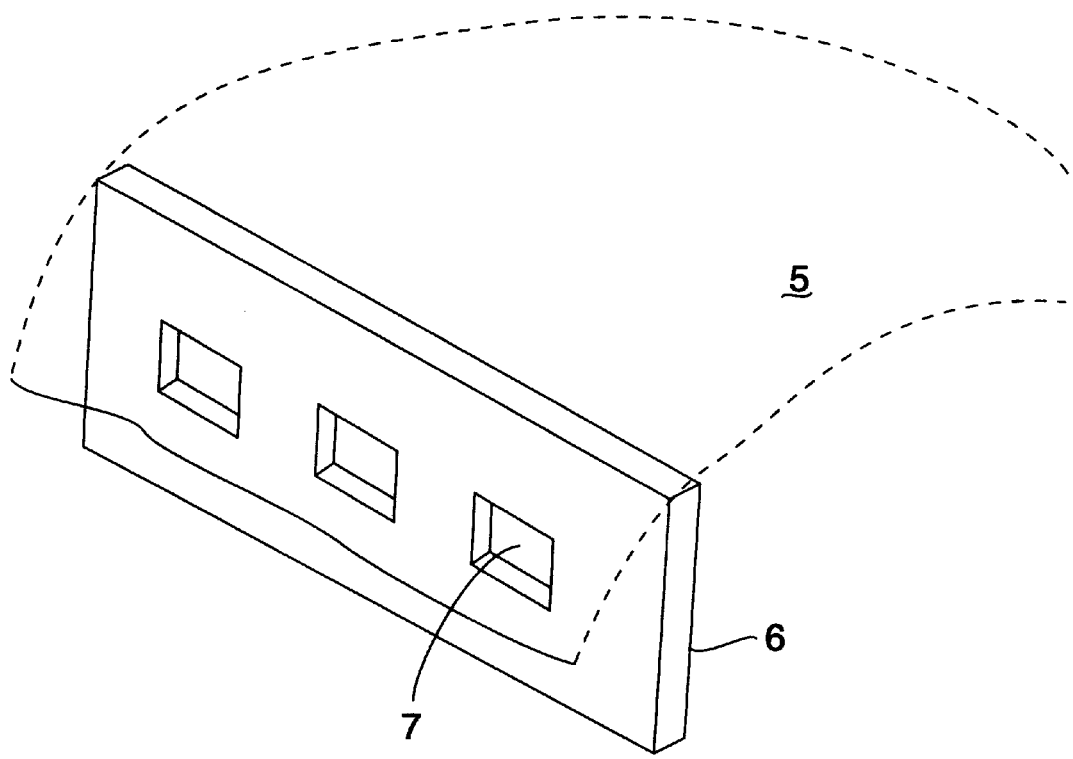
FIG. 3 is a perspective view of an airbag cover with hinge for use in the arrangement of FIG. 1.

FIG. 3 shows the cover 5 and cover hinge 6 in more detail. Clearly seen are the holes 7 which cooperate with the housing flaps 8 to hold the cover in place in the module.

FIG. 4 shows the inflator 2 and inflator bracket 10 in more detail. A hole 15 which is aligned with the housing hole 13 receives an inflator 2. Alternatively the bracket may be integral with the inflator 2. The side wall of the bracket 10 is formed with cut-outs 16 which form teeth 14 at its upper edge. These teeth 14 fit under the raised flaps 8 of the housing 3 to retain the cover hinge 6 in place. The teeth may have a variety of spacing and size to co-operate with and fit under the raised flaps 8. The teeth may be formed by simple slots formed in the upper edge of the side wall of the bracket.

Figure 5:
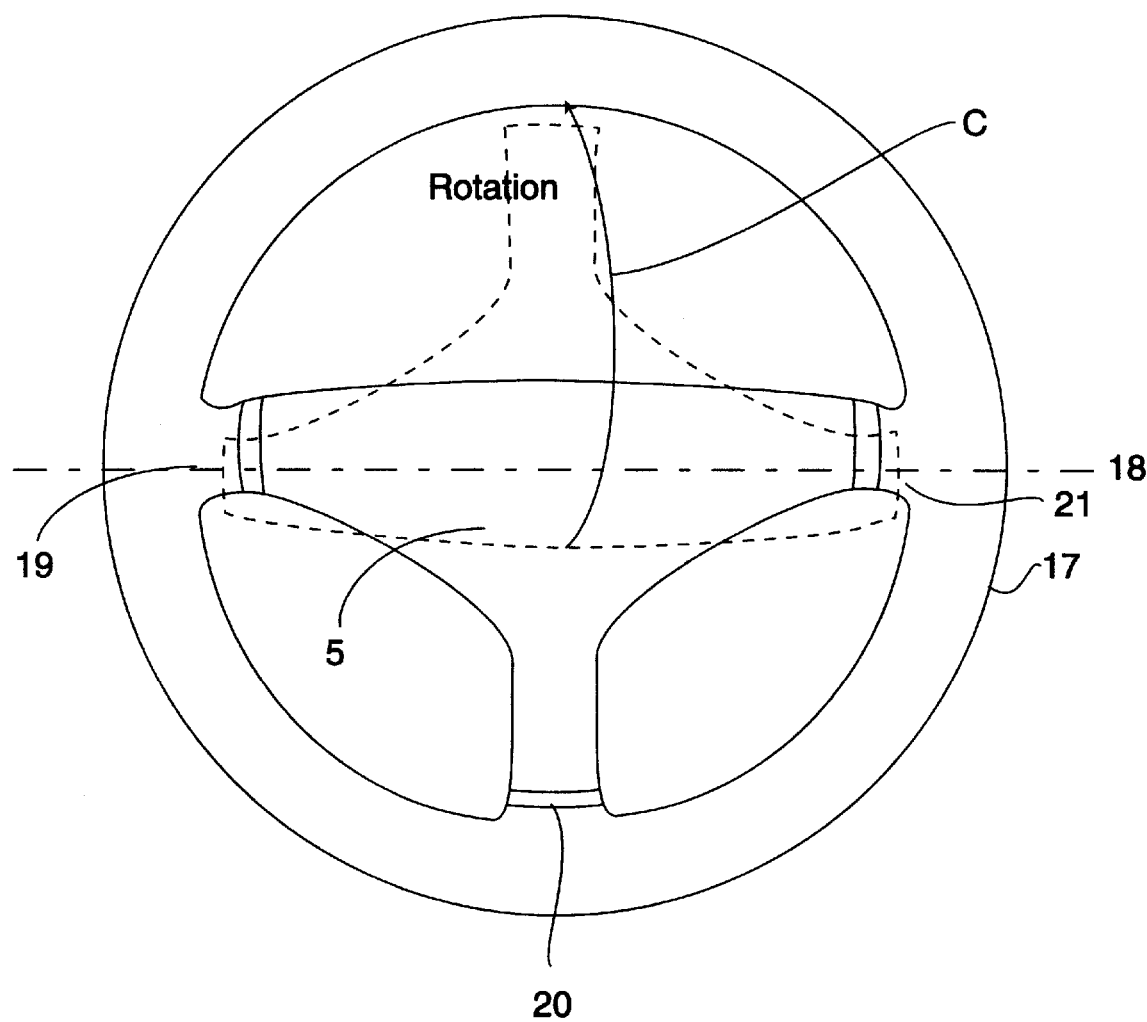
FIG. 5 is a sketch view of the top of a steering wheel incorporating the arrangement of FIG. 1 showing a deployment sequence for an airbag cover.

FIG. 5 shows the airbag arrangement of the invention fitted into a steering wheel 17 (under cover 5). The cover hinge 6 is positioned along the axis 18, which is the axis along which the airbag cover will rotate during deployment. The airbag cover 5 is latched onto the housing flanges at 20 and 21 and will unlatch relatively easily on deployment to allow rotation of the cover about axis 18 in the direction of arrow C to assume the position indicated generally by the broken lines.

What is claimed is:

1. An airbag arrangement comprising:
   an airbag housing having an internal space for receiving an inflatable airbag cushion, bounded by a base wall and a plurality of side walls, at least one side wall having at least one catch member extending therefrom outwardly of the space.
   an airbag cover having a hinge member in which is formed at least one aperture dimensioned and positioned to receive a respective catch member, and
   an inflator mounting bracket having a base wall which is arranged adjacent and parallel to the base of the housing and a side wall which is arranged to extend substantially parallel to the side wall of the housing and to sandwich the hinge member of the cover between the bracket and the housing side wall;
   wherein the side wall of the mounting bracket is formed with at least one tooth at an upper edge, which tooth is dimensioned to fit inside the extending catch member on the side wall of the housing, so as to lock the hinge member to the housing.

2. An airbag arrangement according to claim 1, wherein the inflator mounting bracket is an integral part of an inflator.

3. An airbag arrangement according to claim 1 further comprising a metal insert moulded into the hinge member of the airbag cover.

4. An airbag arrangement according to claim 1 wherein the metal insert is arranged to fit under the extending catch member to retain the cover on the housing.

5. An airbag arrangement according to claim 1, wherein the housing is formed with a plurality of raised catch members which cooperate with respective ones of a plurality of apertures in the hinge member and respective ones of a plurality of teeth in the bracket so as to lock the hinge member to the housing.

6. An airbag arranged according to claim 1 comprising a plurality of teeth on the upper edge of the bracket for cooperating with respective ones of a plurality of apertures in the hinge member to lock the hinge member to the housing.

7. An airbag arrangement according to claim 1 further comprising a metal insert moulded into the hinge member of the airbag cover.

* * * * *